S. T. STOUT.
COTTON AND CORN PLANTER.
No. 174,024. Patented Feb. 22, 1876.
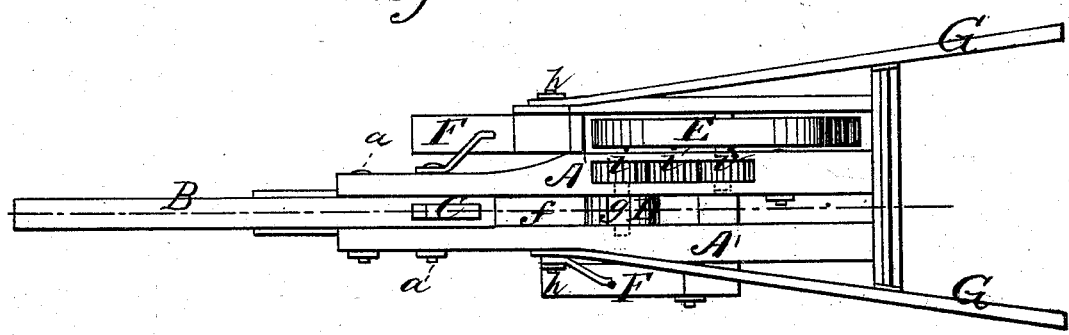
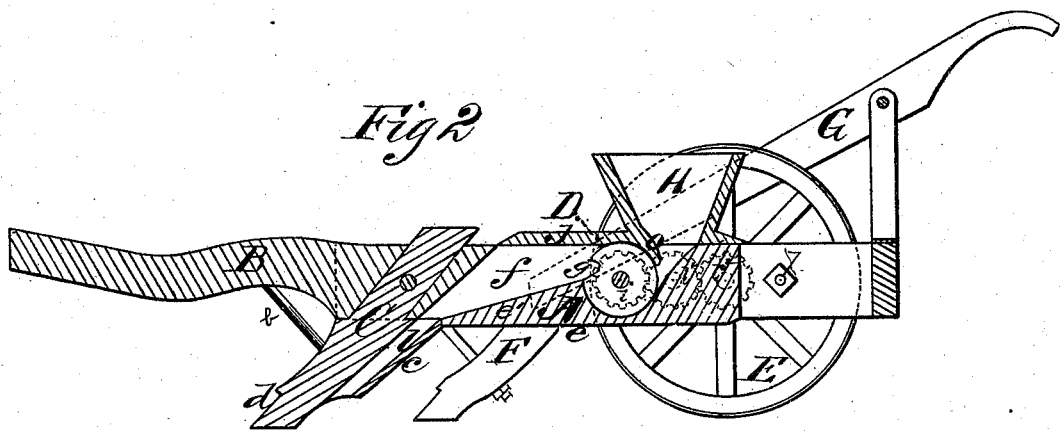
WITNESSES
Mary J. Utley
E. H. Bates
INVENTOR
Stephen T. Stout,
Chipman &c.
ATTORNEYS

UNITED STATES PATENT OFFICE.

STEPHEN T. STOUT, OF CEDAR GROVE, ASSIGNOR OF ONE-THIRD HIS RIGHT TO D. W. SMITH, OF DIRT TOWN, GEORGIA.

IMPROVEMENT IN COTTON AND CORN PLANTERS.

Specification forming part of Letters Patent No. 174,024, dated February 22, 1876; application filed July 10, 1875.

*To all whom it may concern:*

Be it known that I, STEPHEN T. STOUT, of Cedar Grove, in the county of Walker and State of Georgia, have invented a new and valuable Improvement in Cotton and Corn Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my planter, and Fig. 2 is a longitudinal vertical sectional view of the same.

This invention has relation to improvements in machines for planting corn or cotton, wherein a furrow for receiving the seed is cut by a shovel-plow in front of the seed chute or spout, which furrow is then filled up by means of shovels in rear thereof; and the nature of the invention consists in the arrangement and novel construction of the devices used, as will be hereinafter more fully explained and claimed.

In the annexed drawings, A A' designate the frame-beams of my improved planter, and B is the beam proper, the rear end of which is adapted to be received between the said beams, and is secured in position by means of suitable bolts $a$. C represents the front plow-standard, which is mortised into that portion of the beam B which is embraced between frame-beams A A', and is braced against backward displacement by means of a brace-rod, $b$. The rear portion of standard C, which is considerably inclined in relation to beam B, is deeply channeled; and this channel, which is closed by a plate, $c$, constitutes the spout $l$, whereby the seed is conducted from a cylindrical dropper, D, mounted between beams A A', into the furrow cut by a double shovel rigidly secured to the end of the said standard in a rabbet, $d$, formed thereon. The under side of beams A A' is covered by means of a plate, $e$, which is provided with a tongue, $e'$, adapted to be received between beams A A', which tongue inclines upward from front to rear, and is provided with a circular notch for the purpose of allowing room for the seed-dropper D, as shown in Fig. 2. By this means a conduit or chute, $f$, is formed, whereby the seed dropped from a cup, $g$, in the seeder-wheel will be conducted into spout $l$, falling through which, it will be delivered at intervals into the furrow. Dropper D will be provided with a suitable number of seed-cups, $g$, of angular form, of such dimensions as to be capable of receiving the number of grains of corn or cotton-seed usually deposited in a hill, and each time one of these cups is brought over by the revolution of the dropper its contents will be thrown down chute $f$ through spout $l$ into the furrow. Dropper D is operated by means of a trundle-wheel, E, of suitable dimensions through the medium of gears $i$ $i^1$ $i^2$, which are arranged in a slot in frame-beam A'. Gear $i$ is applied upon the shaft of dropper D. $i^1$ on an independent shaft, and $i^2$ upon that of wheel E, and their teeth, interlock, so that when the said wheel is caused to roll by a forward movement of the draft-animals the dropper will be caused to rotate.

F represents two plow-standards of the usual well-known form, which are secured to the side of the planter-frame on opposite edges, and preferably the one in rear of the other, so that after the seed is deposited in the furrow it will be thoroughly covered by successive layers of earth thrown thereon by the shovels.

G represents plow-handles of the usual well-known form, which are rigidly secured, by means of bolts $h$, to the beams A A', as shown in Fig. 1.

H represents a hopper of the usual well-known form, which is rigidly secured to a plate or board, $j$, closing the upper part of the chute. This plate is provided with a lip, $o$, which projects downwardly over the periphery of dropper D, and prevents any portion of a quantity of seed thrown into the said hopper from getting into chute, except what is carried over in cups $g$.

What I claim as new, and desire to secure by Letters Patent, is—

The beams A A', bolted together to form the longitudinal sides of the chute $f$, the seat for the tongue, and to which the plow-standards are attached, in combination with the plate $e$, having the tongue $e'$, spout $l$, and rotating seed-dropper D, substantially as described and for the purpose set forth.

In testimony that I claim the above I have hereunto subscribed my name in the presence of two witnesses.

STEPHEN T. STOUT.

Witnesses:
    H. P. LUMPKIN,
    W. H. LOVE.